Patented Nov. 19, 1940

2,221,772

UNITED STATES PATENT OFFICE 2,221,772

INSECTICIDAL AND FUNGICIDAL OIL

Frank App, Bridgeton, N. J.

No Drawing. Application September 21, 1938,
Serial No. 231,070

9 Claims. (Cl. 167—28)

This invention relates to the protection of vegetable matter from insects, fungi or other parasites and particularly to insecticidal and fungicidal sprays adapted to be applied to vegetation to protect it against damage from such sources.

It is common practice to employ sprays of various kinds to control or kill insects and fungi but it is not always appreciated that such sprays are used in different ways and must be constituted differently in order to achieve the desired results without doing something which is undesired as well. For example, the common household fly spray must kill flies, mosquitoes and other household insects without being toxic to humans or domestic animals or staining clothes, walls, draperies or the like. A spray that is used for spraying vegetation, on the other hand, presents an entirely different problem for the things that are non-toxic to animals are not necessarily non-toxic to plants and vice versa, and the types of insects and fungi that attack plants are not generally the same as those that attack animals. Hence a spray that may be effective for one use may be entirely ineffective for the other or may itself injure the thing it is intended to protect.

The present invention is concerned with plant sprays and more particularly with plant sprays that utilize an oil base as distinguished from those that utilize an aqueous carrier, either as the external phase of an oil in water emulsion or as a solute for the active component.

Prior to this invention it has been the general understanding of those skilled in the art that the application of unemulsified oils directly to vegetation was definitely harmful to the vegetation. One exception to this understanding was the result of certain tests made at the New Jersey Agricultural Experiment Station which indicated that a very pure low boiling petroleum fraction having substantially no unsulphonatable residue could be applied to vegetation without harmful effect. The results of this experiment are reported in the Journal of Economic Entomology, vol. 27, page 1186. These experiments have not been followed by any substantial commercial developments for the reason that such use of oils of the type employed in these experiments is uneconomical due to the high cost of the oil and its relatively low insecticidal and fungicidal efficiency.

According to the present invention it has now been discovered that not only can such oils be applied to vegetation without detrimental effects, but also that a less thoroughly purified oil of certain definite characteristics can be applied to vegetation in an unemulsified form, without detrimental effect and with far better insecticidal and fungicidal results. Furthermore, the particular type of oil that is used according to this invention can be greatly augmented in its effectiveness by dissolving or dispersing therein additional insecticidal material such as rotenone, rotenone bearing roots, derris, derris resins, pyrethrum, nicotine alkaloids, copper compounds, such as copper oxide, basic copper sulphate, organic copper compounds, or the like. This particular type of oil is to be understood as possessing insecticidal and fungicidal value of its own and acting as an effective and economical carrier for the insecticidal and fungicidal materials dispersed or dissolved therein.

The oils that have been found satisfactory for use according to this invention are mineral oils of the general nature of normally refined kerosene. They have a viscosity at 100° F. of about 32 to 50° Saybolt, boil between around 290 and 750° F. and have an unsulphonatable residue of about 85 to 96%. Preferably, they fall within even narrower limits and have a viscosity at 100° F. of 32 to 38 Saybolt, a boiling range of 350 to 630° F. and an unsulphonatable residue of 92 to 96%. It should be understood that while oils falling within the broader ranges described above may be used they vary greatly as regards the tolerance which vegetation has for them. This tolerance is determined largely by two factors:

The degree to which the oil penetrates the foliage.
Rate of evaporation.

It has been found that oils falling within the narrower limits described above, and having a viscosity at 100° F. of 32 to 38 Saybolt and a boiling range of 350 to 630° F. and an unsulphonatable residue of 92 to 96% are much better to use because vegetation will tolerate larger dosages without injury due to the fact that with such oils the degree or rate of penetration of the foliage is low, and at the same time, the rate of evaporation is not too slow.

By using such oils either alone or in combination with insecticides dispersed or dissolved, therein, it is possible to treat large areas of vegetable matter with very small quantities of the compositions, using so much less per acre than is necessary when an emulsion is used as to effect great economies both in labor and material costs. A still further advantage is gained by reason of the fact that the present insecticide can be applied under a wider range of weather conditions than can dusts or emulsion types of sprays. Thus, the insecticide of this invention can be applied with wind velocity as high as 20 miles an hour and in the presence of considerable moisture whereas either of these conditions prevents satisfactory utilization of other types of insecticides. A still further advantage is gained by reason of the fact that the insecticides and fungicides of this invention cling remarkably to the foliage with the result that what may be described as their residual efficiency as distinguished from their effect at the time of application is not seriously impaired even by rainfall shortly after the application, whereas with most insecticidal and fungicidal dusts and sprays in common use, most of the efficiency is destroyed under similar conditions.

As examples of actual tests which have been made with insecticides formed according to this invention the following examples are given:

*Example I.*—Using 96 gallons of mineral oil, having a viscosity at 100° F., of 42 seconds Saybolt, a distillation range of 320° F. to 630° F., and an unsulphonatable residue of 92%, and combining with this 4 gallons of a solution of derris resins in a mixture of 80 parts steam distilled pine oil and 20 parts of brown camphor oil, and containing 5% by weight of rotenone and approximately 13% by weight of other derris extractives, 100 gallons of finished insecticide was obtained. This insecticide applied to pea vines, heavily infested with pea aphides gave a completely satisfactory control of the aphides when applied at the rate of 4 gallons to the acre.

*Example II.*—Using 96 gallons of mineral oil, such as described in Example I, and 4 gallons of nicotine alkaloid of 50% strength, 100 gallons of finished insecticide was obtained which applied at the rate of 3 to 4 gallons per acre controlled heavy infestations of pea aphides and bean aphides.

*Example III.*—Using mineral oil of the type previous described, and mixing with this, commercial copper compounds such as copper hydro or copper zeolite, in such ratio as to give one pound of metallic copper to each gallon of the mixture, a fungicide which gave effective control of mildew on beans was obtained.

*Example IV.*—Using the mixture described in Example III, and combining with it the derris resin solution described in Example I, in the ratio of 4 gallons of the derris resin solution to 96 gallons of the oil copper mixture, a combination fungicide and insecticide was obtained which in a single application gave effective control of mildew, Mexican bean beetle and bean leafhopper on beans.

*Example V.*—Using 98 gallons of mineral oil having a viscosity at 100° F. of 35 seconds Saybolt and a distillation range of 350° F. to 630° F. and an unsulphonatable residue of 94 to 96% and combining with this 2 gallons of a specially prepared colloid or semi-colloid, semi-suspensoid of derris resins in oil of the same type described above and containing 10% by weight of rotenone and approximately 15% by weight of other derris extractives, 100 gallons of finished insecticide was obtained. This insecticide was applied to pea vines heavily infested with pea aphides and gave a completely satisfactory control of the aphides when applied at the rate of 4 gallons to the acre. This same insecticide was applied at approximately the same rate to beans, and gave a completely satisfactory control of the Mexican bean beetle, the flea beetle and the bean leaf hoppers. Applied to potato vines, it gave a completely satisfactory control of potato flea beetles, Colorado potato beetles, and potato leaf hoppers.

*Example VI.*—Using mineral oil of the type described in Example V and employing 97 gallons of oil, 2 gallons of the rotenone concentrate described in Example V and 1 gallon of nicotine alkaloid containing 80% nicotine, 100 gallons of finished insecticide was obtained. This insecticide applied to pea vines, at the rate of 4 gallons or a little less to the acre gave an even better control of the pea aphide than the insecticide described in Example V because of its more immediate effect on the pea aphides, partially protected in the buds.

*Example VII.*—Using mineral oil of the type described in Example V and mixing with this commercial copper compounds such as copper hydro or copper zeolite in such ratio as to give 1 pound metallic copper to each gallon of mixture a fungicide which gave an effective control of mildew on beans was obtained.

*Example VIII*—Using mineral oil of the type previously described in Example V, mixing with this a specially prepared red copper oxide having a particle size of approximately three-tenths of a micron in such ratio as to give 1 pound metallic copper to each 4 gallons of the mixture a fungicide which gave effective control of mildew on beans and of late blight on potatoes was obtained.

*Example IX.*—Using the mixtures described in Example VIII and combining with them a special derris resin concentrate described in Example V, a combination insecticide and fungicide was obtained which in a single application gave effective control of mildew, Mexican bean beetle, bean leaf hoppers and flea beetles on beans and which gave effective control of late blight, Colorado potato beetle, potato flea beetle and potato leaf hopper on potatoes.

In cases where the term "rotenone" is used, it is understood that it shall include rotenone, or the extractives of rotenone bearing roots, or any fraction thereof.

Also, in cases where the term "copper compounds" is used, it will be understood that the term covers any copper compound, such for instance as copper basic sulphate, copper oxide, organic copper compounds, and the like.

Of course, it will be understood that while some specific examples have been given of mixtures and their uses, it is understood that various modifications and changes may be made without departing from the invention herein set forth and hereafter claimed.

This application is a continuation in part of application Serial No. 198,486, filed Mar. 28, 1938, by this same inventor.

I claim:

1. An insecticidal and fungicidal horticultural spray that comprises an unemulsified mineral oil having approximately the following characteristics:

| | |
|---|---|
| Saybolt viscosity at 100° F. | 32 to 50 |
| Boiling range, degrees F. | 290 to 750 |
| Unsulphonatable residue, percent | 85 to 96 |

2. An insecticidal and fungicidal horticultural spray that comprises an unemulsified mineral oil having approximately the following characteristics:

| | |
|---|---|
| Saybolt viscosity at 100° F. | 32 to 50 |
| Boiling range, degrees F. | 290 to 750 |
| Unsulphonatable residue, percent | 92 to 96 |

3. An insecticidal and fungicidal horticultural spray that comprises an unemulsified mineral oil having approximately the following characteristics:

| | |
|---|---|
| Saybolt viscosity at 100° F. | 32 to 50 |
| Boiling range, degrees F. | 350 to 630 |
| Unsulphonatable residue, percent | 85 to 96 |

4. An insecticidal and fungicidal horticultural spray that comprises an unemulsified mineral oil having approximately the following characteristics:

| | |
|---|---|
| Saybolt viscosity at 100° F. | 32 to 38 |
| Boiling range, degrees F. | 290 to 750 |
| Unsulphonatable residue, percent | 85 to 96 |

5. An insecticidal and fungicidal horticultural spray that comprises an unemulsified mineral oil having approximately the following characteristics:

| | |
|---|---|
| Saybolt viscosity at 100° F. | 32 to 38 |
| Boiling range, degrees F. | 350 to 630 |
| Unsulphonatable residue, percent | 92 to 96 |

6. An insecticidal and fungicidal horticultural spray that comprises an unemulsified mineral oil having approximately the following characteristics:

| | |
|---|---|
| Saybolt viscosity at 100° F. | 32 to 50 |
| Boiling range, degrees F. | 290 to 750 |
| Unsulphonatable residue, percent | 85 to 96 | and an additional insecticidal or fungicidal material carried thereby.

7. A method of protecting vegetation against insects and fungi that comprises spraying said vegetation with a composition comprising an unemulsified mineral oil of approximately the following characteristics:

| | |
|---|---|
| Saybolt viscosity at 100° F. | 32 to 50 |
| Boiling range, degrees F. | 290 to 750 |
| Unsulphonatable residue, percent | 85 to 96 |

8. A method of protecting vegetation against insects and fungi that comprises spraying said vegetation with a composition comprising an unemulsified mineral oil of approximately the following characteristics:

| | |
|---|---|
| Saybolt viscosity at 100° F. | 34 to 38 |
| Boiling range, degrees F. | 350 to 630 |
| Unsulphonatable residue, percent | 92 to 96 |

9. A method of protecting vegetation against insects and fungi that comprises spraying said vegetation with a composition comprising an unemulsified mineral oil of approximately the following characteristics:

| | |
|---|---|
| Saybolt viscosity at 100° F. | 32 to 50 |
| Boiling range, degrees F. | 290 to 750 |
| Unsulphonatable residue, percent | 85 to 96 | and an additional insecticidal or fungicidal material carried thereby.

FRANK APP.